(12) United States Patent  
Prokhorov

(10) Patent No.: US 8,738,282 B1
(45) Date of Patent: May 27, 2014

(54) RECONFIGURABLE VEHICLE CONTROL SYSTEM AND METHOD

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/672,368

(22) Filed: Nov. 8, 2012

(51) Int. Cl.
*G06F 17/10* (2006.01)

(52) U.S. Cl.
USPC ......................................................... 701/301

(58) Field of Classification Search
USPC .................................................... 701/37, 301
See application file for complete search history.

(56) References Cited

U.S. PATENT DOCUMENTS

| | | | |
|---|---|---|---|
| 2,749,137 A | 6/1956 | Thomsen et al. |
| 3,306,390 A | 2/1967 | Jamme |
| 3,842,926 A | 10/1974 | Williams et al. |
| 4,266,627 A | 5/1981 | Lauber |
| 4,350,222 A | 9/1982 | Lutteke et al. |
| 4,395,191 A | 7/1983 | Kaiser |
| 4,558,758 A | 12/1985 | Littman et al. |
| 4,779,691 A | 10/1988 | Werdner |
| 5,137,101 A | 8/1992 | Schaeff |
| 6,311,795 B1 | 11/2001 | Skotnikov et al. |
| 6,443,687 B1 | 9/2002 | Kaiser |
| 7,832,741 B2 | 11/2010 | Donaldson |
| 8,081,209 B2 | 12/2011 | Ji et al. |
| 8,230,961 B2 | 7/2012 | Schneidewind |
| 2008/0159620 A1* | 7/2008 | Camus et al. ................. 382/154 |
| 2010/0092073 A1 | 4/2010 | Prokhorov |
| 2010/0215254 A1 | 8/2010 | Prokhorov |

FOREIGN PATENT DOCUMENTS

JP 63-275486 11/1988

* cited by examiner

*Primary Examiner* — Muhammad Shafi
*Assistant Examiner* — Michael D Lang
(74) *Attorney, Agent, or Firm* — Oblon, Spivak, McClelland, Maier & Neustadt, L.L.P.

(57) ABSTRACT

A processing system for a driven vehicle comprising a detector to detect an object which is in an area surrounding the driven vehicle via one or more sensors mounted on the driven vehicle, and to generate position data and size data corresponding to the detected object. The system may include a calculator to calculate an adjustment signal based on the position data and the size data. The system may also include a controller to adjust the driven vehicle's cabin height and/or the driven vehicle's wheelbase width, based on the calculated adjustment signal, such that the driven vehicle avoids colliding with the detected object. Collision may be avoided by the system via elevating the vehicle cabin above the road using an expandable suspension system. Further, an omni-directional telescoping shaft and wheel assembly system with in-wheel motors may be used for maneuvering the vehicle and/or altering the wheelbase width.

16 Claims, 11 Drawing Sheets

RECONFIGURABLE VEHICLE CONTROL SYSTEM AND METHOD

BACKGROUND

This disclosure relates to controlling the operation of a reconfigurable vehicle based on environmental monitoring. Vehicle systems can utilize external sensors and/or imaging devices to detect objects surrounding a vehicle. These objects can be detected and monitored with respect to a path of the vehicle.

SUMMARY

Processing systems which implement algorithmic processes to control electromechanical devices are discussed herein.

A processing system for a driven vehicle can include a detector configured to detect an object which is in an area surrounding the driven vehicle via one or more sensors mounted on the driven vehicle, and to generate position data and size data corresponding to the detected object. A calculator can be configured to calculate an adjustment signal based on the position data and the size data, and a controller can be configured to adjust the driven vehicle's cabin height or the driven vehicle's wheelbase width, based on the calculated adjustment signal, such that the driven vehicle avoids colliding with the detected object.

The detector can be further configured to update the position data and the size data at a predetermined frequency to form tracking history data, and the calculator can be further configured to calculate a first trajectory corresponding to the detected object, based on the tracking history data, calculate a second trajectory corresponding to the driven vehicle based on the vehicle's current velocity and direction of motion, and calculate a collision time at which the first trajectory intersects the second trajectory. The controller can be configured to control a rate at which the vehicle's height or wheelbase width is adjusted, based on the calculated collision time. The controller can be configured to control a direction or a speed of one or more of the vehicle's wheels, based on the calculated adjustment signal. The controller can adjust the driven vehicle's cabin height by controlling one or more telescoping shafts which are respectively connected at opposing ends to the driven vehicle's cabin and a wheel assembly.

Position data can include information describing a position of a detected object relative to the driven vehicle. Size data can include information describing the dimensional characteristics of the detected object.

The controller can adjust the vehicle's wheelbase width by controlling the direction or speed of one or more of the vehicle's wheels. The controller can adjust the vehicle's wheelbase width by controlling a length of one or more telescoping shafts which are respectively connected at opposing ends to the driven vehicle's cabin and a wheel assembly. The controller can adjust the vehicle's wheelbase width by controlling a length, in combination with the direction or the speed of one or more of the vehicle's wheels, of one or more telescoping shafts which are respectively connected at opposing ends to the driven vehicle's cabin and a wheel assembly. The telescoping shafts can each respectively be connected to the vehicle cabin at a joint which allows the telescoping shafts to independently pivot in a direction around the vehicle cabin. The joint can include a locking mechanism configured to prevent the telescoping shafts from pivoting around the vehicle cabin when a braking signal for the wheel assemblies is received.

The detector can be configured to classify the detected object based on the position data or the size data.

A control method, process and/or algorithm can include detecting an object which is in an area surrounding the driven vehicle via one or more sensors mounted on the driven vehicle, generating position data and size data corresponding to the detected object, calculating an adjustment signal based on the position data and the size data, and adjusting the driven vehicle's height and/or the driven vehicle's wheelbase width, based on the calculated adjustment signal, such that the driven vehicle avoids colliding with the detected object. A non-transitory computer readable medium having instructions stored therein that when executed by a processor, can cause the processor to perform such a method, process and/or algorithm.

A vehicle can include a detector configured to detect an object in an area surrounding the vehicle via one or more sensors mounted on the vehicle, and to generate position data and size data corresponding to the detected object, a calculator configured to calculate an adjustment signal based on the position data and the size data, and a controller configured to adjust the vehicle's cabin height or the vehicle's wheelbase width, based on the calculated adjustment signal, such that the vehicle avoids colliding with the detected object.

The vehicle can include one or more telescoping shafts which are respectively connected at opposing ends to the vehicle's cabin and a wheel assembly. Following a calculation of the adjustment signal, the controller can adjust the vehicle's cabin height or wheelbase width, based on the adjustment signal, by elongating or contracting the telescoping shafts. The vehicle's telescoping shafts can be connected to the vehicle cabin by one or more joints. The joints can be configured to permit the telescoping shafts to pivot around the vehicle. The vehicle's joints can include a braking mechanism configured to prevent the telescoping shafts from pivoting around the vehicle.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1A:
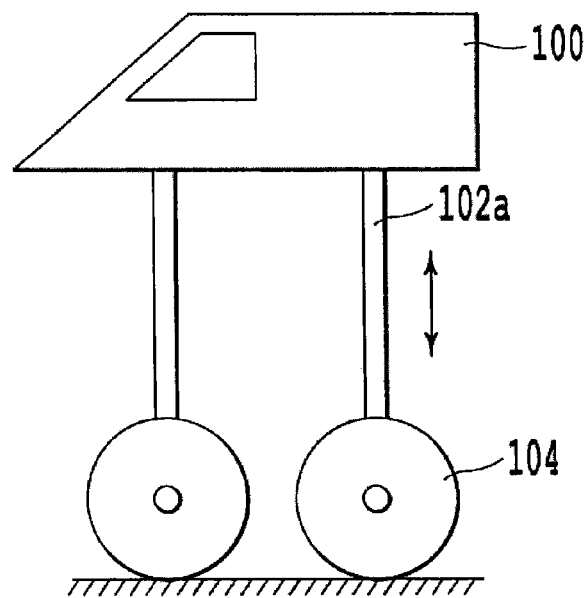
FIG. 1A illustrates a side view of a vehicle according to a first exemplary aspect.

Aspects of this disclosure improve throughput capacity of existing interstate road infrastructure by allowing a passenger vehicle to operate "above" other vehicles or obstacles on the road while having a low footprint on the road itself. A vehicle cabin can be suspended above the road using an expandable suspension system, such as pantograph and/or telescopic drives for the vehicle cabin. An omni-directional telescoping shaft and wheel assembly system with in-wheel motors can be utilized for high maneuverability.

A vehicle control system can utilize a hybrid power plant, preferably with in-wheel electric motors powered by a generator with battery and super capacitors energized by a compact turbojet or an efficient internal combustion engine with multi-fuel capability. Automatic reconfiguration of a vehicle structure, based on a detection of objects in the surrounding environment, can be implemented for adaptive driving.

A faster overall average speed of transportation can be achieved due to improved maneuverability. Improved maneuverability can include the ability to pass other vehicles in congested highway areas by elevating the vehicle cabin above other road vehicles while leaving only in-line wheel assemblies in contact with the road to support the weight of the vehicle. Vehicle reconfiguration can provide an ability to maintain a minimum road footprint (e.g., similar to that of two motorcycles), while maintaining the maneuverability and payload capacity of a typical passenger highway vehicle.

Sensing obstacles along a highway from an elevated position can improve sensing capabilities due to an increased sensor height, which can reduce the likelihood of occlusions by other vehicles and/or obstacles on the highway. The increased height can result in obstacles being detected at a farther distance, thereby providing more time to make vehicle reconfiguration decisions.

Aspects of the present disclosure will now be discussed with reference to the drawings, wherein reference numerals designate identical or corresponding parts throughout the several views.

FIG. 1A illustrates one exemplary arrangement of a vehicle operating with a control system. As shown in FIG. 1A, vehicle cabin 100 is elevated above a road by one or more telescoping shafts 102a. Additionally, one or more wheel assemblies, such as wheel assembly 104, are in contact with the road to provide maneuverability for the vehicle.

Figure 1B:
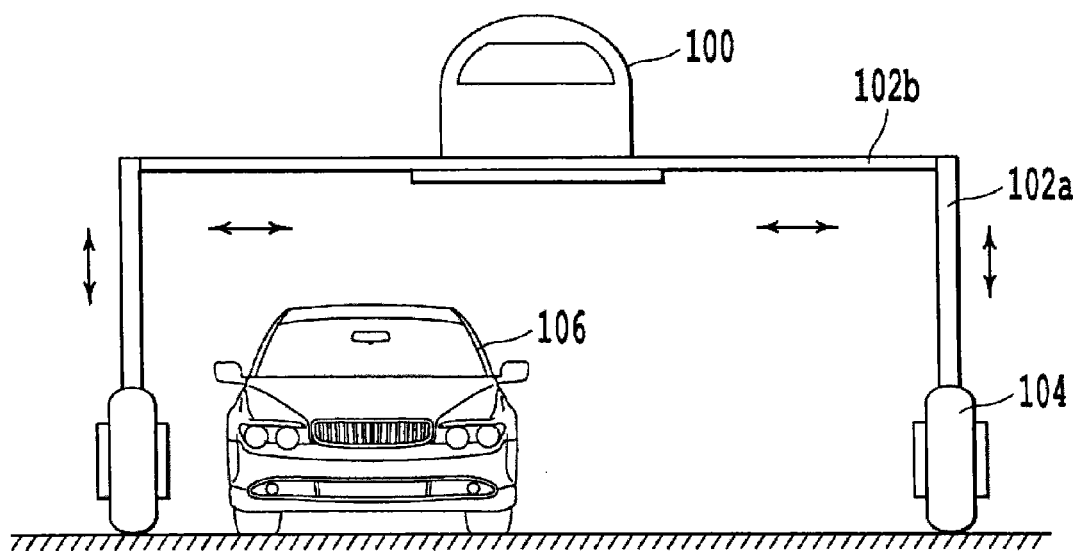
FIG. 1B illustrates a front view of the vehicle shown in FIG. 1A.

FIG. 1B illustrates a front view of the vehicle, together with another vehicle. As shown in FIG. 1B, vehicle cabin 100 is elevated above a road by multiple telescoping shafts 102a, which are connected to wheel assembly 104 on opposing sides of vehicle cabin 100. Additionally, telescoping shaft 102b may be configured such that a wheelbase width (i.e., the distance spanning between opposing wheel assemblies 104) can be altered. In particular, hydraulic pumps or the like may be used to expand or contract one or more telescoping shafts 102b such that the wheelbase width is increased or decreased.

As shown in FIG. 1B, the exemplary arrangement allows for a driver to maintain highway speed and maneuverability while driving at an elevated height such that an obstacle, such as a vehicle represented by obstacle 106, can be avoided. Further, a control system may detect an obstacle in an area surrounding the vehicle via external sensors. In response to the detection, the system may automatically reconfigure the vehicle support structure, including the telescoping shafts and/or wheel assemblies, such that the vehicle passes over the detected obstacle.

Figure 2A:
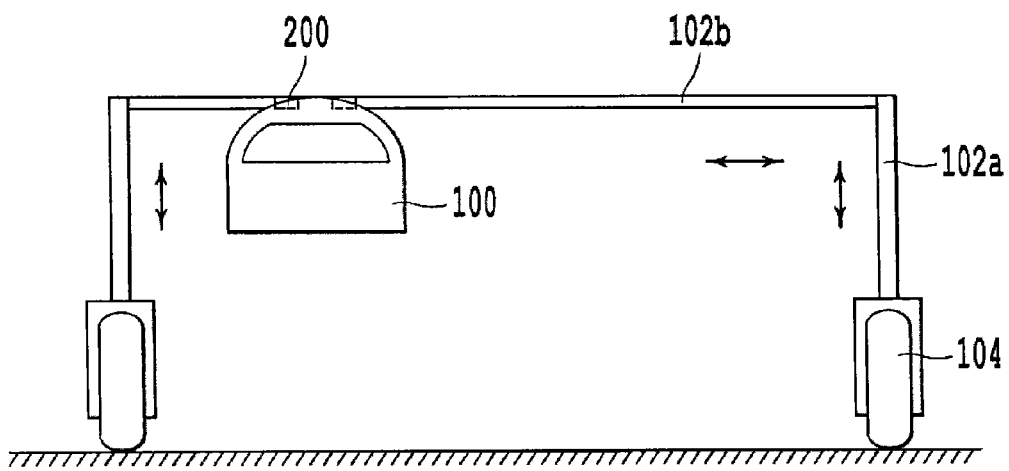
FIG. 2A illustrates a front view of a vehicle according to a second exemplary aspect.

FIG. 2A illustrates another arrangement. The vehicle shown in FIG. 2A includes a vehicle cabin 100, telescoping shafts 102a and 102b, and multiple wheel assemblies 104. The telescoping shafts 102b are each connected to vehicle cabin 100 at a joint 200, which may be a passive joint allowing the telescoping shafts and wheel assemblies to independently rotate about the vehicle cabin 100.

Figure 2B:
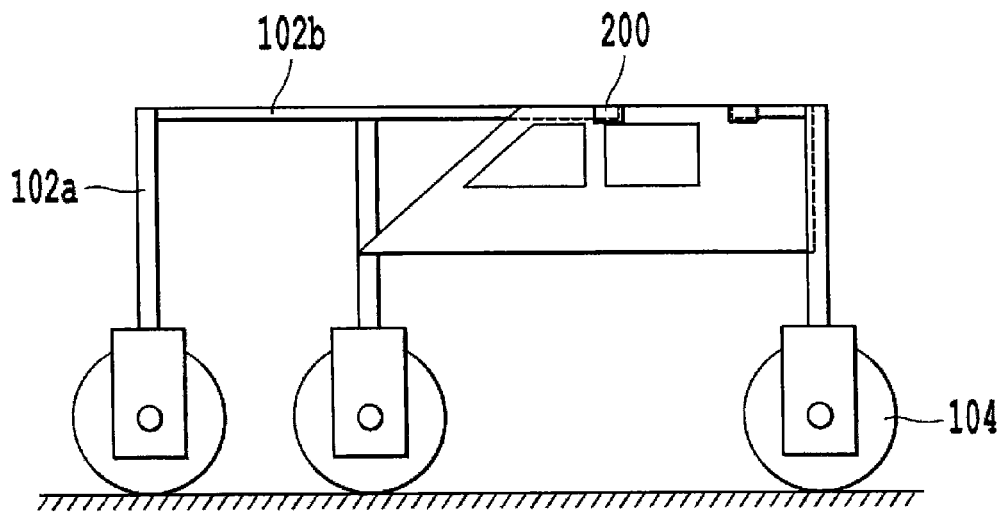
FIG. 2B illustrates a side view of the vehicle shown in FIG. 2A.

FIG. 2B shows a side view of the arrangement of FIG. 2A. As shown in FIG. 2B, the exemplary arrangement of telescoping shaft 102b connected to joint 200 provides for the ability to rotate one or more of the wheel assemblies and telescoping shafts about the vehicle cabin 100. For example, as shown in FIG. 2B, the wheel assembly and telescoping shaft connected at the front driver's side of vehicle cabin 100 may rotate such that the units are not aligned with the corresponding wheel assembly and telescoping shaft on the opposite side of vehicle cabin 100.

Figure 2C:
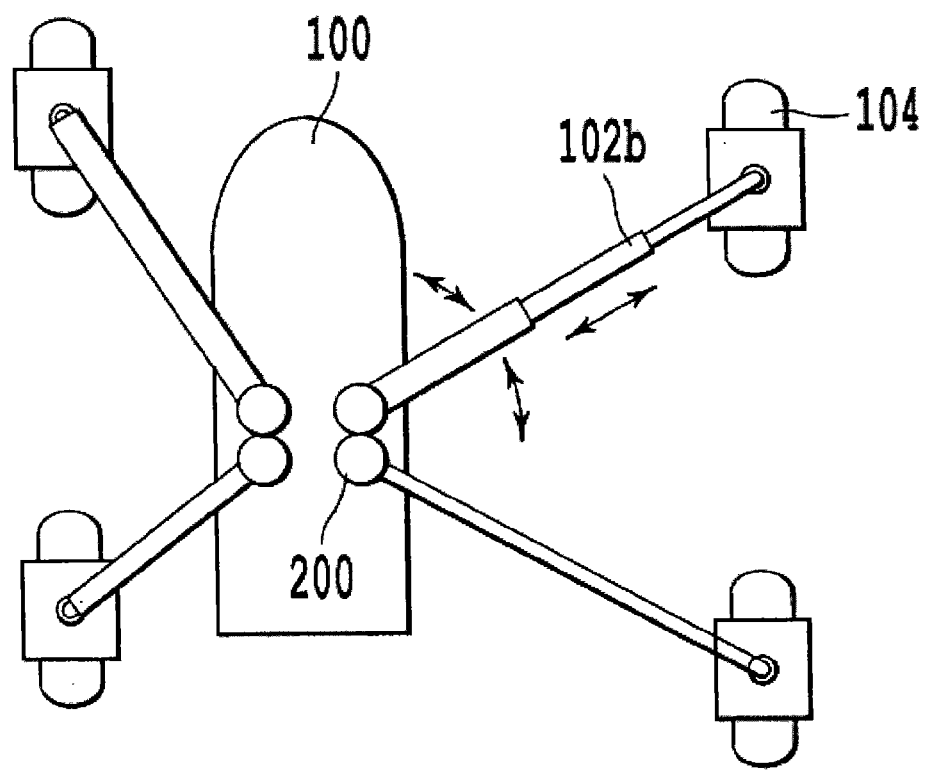
FIG. 2C illustrates a top view of the vehicle shown in FIG. 2A.

FIG. 2C provides a top view of the exemplary arrangement of FIG. 2A. As shown in FIG. 2C, four telescoping shafts are connected at corresponding joints 200 such that each of the telescoping shafts and wheel assemblies may independently rotate about vehicle cabin 100. Joint 200 may be a passive joint which allows omnidirectional movement of each respective telescoping shaft and wheel assembly. The use of a passive (i.e., unactuated) omnidirectional joint provides for the ability to independently control the relative direction and speed of each wheel assembly using a wheel motor such that the overall vehicle support configuration is changed. For example, by angling the two front wheel assemblies of FIG. 2C such that the leading portion (i.e., the side corresponding to the vehicle's direction of motion) toward vehicle cabin 100 and accelerating the wheels relative to the two rear wheel assemblies, the wheelbase width of the two front wheel assemblies becomes more narrow. Similarly, by angling the two rear wheel assemblies such that the leading portion faces away from vehicle cabin 100 and decelerating the wheels relative to the front wheel assemblies, the wheelbase width of the two rear wheel assemblies becomes more narrow. Also, the joint 200 may include a brake to inhibit motion of the telescoping shaft 102b.

As illustrated in FIG. 2C, hydraulic actuators controlling telescoping shafts 102a and 102b may be provided to independently control the length of the telescoping shafts such that the elevation of vehicle cabin 100 and the wheelbase width of the vehicle are respectively altered.

Figure 3A:
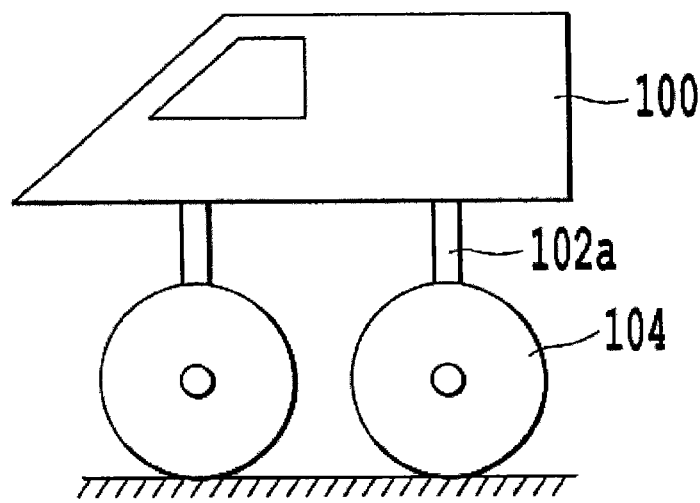
FIG. 3A illustrates a side view of a vehicle according to a third exemplary aspect.
Figure 3B:
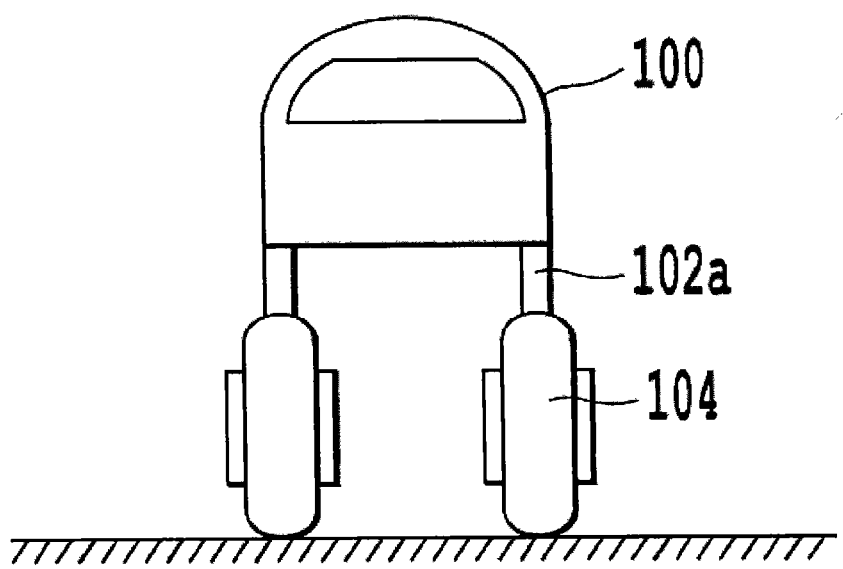
FIG. 3B illustrates a front view of the vehicle shown in FIG. 3A.

FIGS. 3A and 3B respectively illustrate side and front views of another arrangement of a vehicle. The vehicle of FIGS. 3A and 3B is illustrated in a maximum compactness mode, wherein the vehicle may fit within the width of a single highway lane. A vehicle in the arrangement of FIGS. 3A and 3B may appear as a typical sport utility vehicle. This maximum compactness mode may or may not be the primary mode of operation of such a vehicle. In one aspect, the maximum compactness mode may be primarily used for boarding/exiting or parking the vehicle.

FIGS. 1A-3B, illustrate non-limiting examples of an exemplary vehicle control system's operation are discussed below. For simplicity, a vehicle on which a vehicle control system according to the present disclosure is used is hereinafter referred to as a reconfigurable vehicle.

First, to extend the wheelbase width between wheel assemblies 104, a control system according to an exemplary embodiment may accelerate all wheels at angles pointing outward from vehicle cabin 100. Specific angles are speed dependent and chosen to prevent skidding and/or loss of horizontal controllability of the reconfigurable vehicle. Accordingly, the control system may work in combination with or incorporate vehicle traction control and stability control systems.

To reduce the width between wheels, the control system may accelerate all wheels at angles pointing inward towards vehicle cabin 100. Further, to maintain vertical stability of the vehicle, the control system may maintain the vehicle cabin 100 center of gravity well inside a polygon formed by the centers of the wheels in each wheel assembly 104. In order to achieve this vertical stability, the control system may slow the rear or front wheels in wheel assemblies 104 temporarily with respect to the acceleration of the opposing pair of wheels, effectively "dragging the feet" of the vehicle.

To maintain the reconfigurable vehicle configuration in a condition of sudden braking, as discussed above, braking mechanisms may be provided in omni-directional joints, such as joint 200, to prevent the braking forces from uncontrollably rotating supporting beams, such as telescoping shafts 102a and 102b. The control system may send appropriate command signals to the braking mechanisms.

In a reconfigurable vehicle with a wheelbase width spanning two highway lanes, e.g., the vehicle shown in FIG. 1B, a sensor, e.g., a long-range radar, detects a tall obstacle in the path of the reconfigurable vehicle. Based upon the sensor input, the control system determines the obstacle size is consistent with a semi-truck. The control system captures a camera image in the area of the detected obstacle and confirms that the semi-truck is in the reconfigurable vehicle's path, utilizing a path planning and navigation system. The control system computes approximately when the reconfigurable vehicle will meet the semi-truck on the road. This calculated time of arrival can then by used to estimate how quickly a vehicle reconfiguration is needed. Based upon the size of the semi-truck relative to the maximum height at which the control system can elevate the reconfigurable vehicle's cabin, the control system determines vehicle cabin elevation is not a collision avoidance option and therefore the wheelbase width must be reduced to the width of approximately one highway lane in order for the reconfigurable vehicle to pass on either side of the semi-truck. If the control system determines there is no traffic next to the semi-truck, then the reconfigurable vehicle may reduce its height and width to fit in a space provided by a single highway lane and/or the shoulder area of the highway. Alternatively, if there is traffic next to the semi-truck, then the control system may wait until space becomes available before bypassing the semi-truck by the above-described reconfiguration. The control system then initiates a reconfiguration to reduce the reconfigurable vehicle's wheelbase width to one lane (e.g., the maximum compactness mode vehicle shown in FIG. 3B) and the reconfigurable vehicle passes around the semi-truck.

A multi-plane lidar system or its equivalent (e.g., a flash lidar, a single-plane vertically scanning lidar) measures height profiles of obstructing vehicles and SUVs that are in the path of a reconfigurable vehicle. Based on sensor data resulting from the lidar system, the control system determines that one of the obstructing vehicles' height is greater than the current height of the reconfigurable vehicle's cabin. In response to this determination, the control system reconfigures the reconfigurable vehicle by temporarily raising the height of vertical telescopic shafts to pass over the tall vehicle. See, e.g., the exemplary vehicle configuration of FIG. 1B. After passing over the tall vehicle, camera imagery and known image analysis techniques may, e.g., detect and analyze a road sign to determine that the highway width will narrow to one lane. The control system may then initiate another reconfiguration to reduce the reconfigurable vehicle's height and wheelbase width to maximum compactness mode, such as in FIG. 3B. Following reconfiguration to maximum compactness mode, the reconfigurable vehicle may then operate similarly to a typical SUV within the current constraints of the highway infrastructure.

Figure 4:
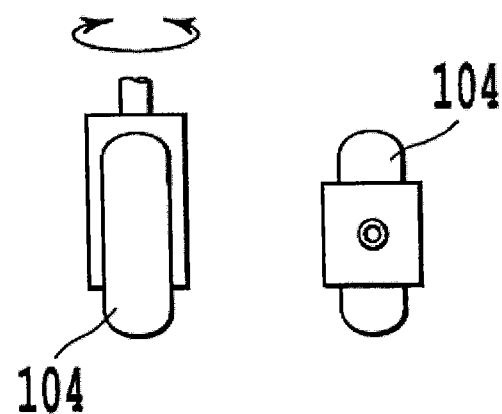
FIG. 4 illustrates an exemplary wheel and corresponding support assembly.

Referring back to the figures, FIG. 4 illustrates a wheel assembly according to an exemplary embodiment. Wheel assembly 104 of FIG. 4 may include a regenerative braking system (e.g., as proposed in U.S. Pat. No. 8,230,961, "Energy Recovery System for Vehicles and Wheels Comprising the Same," issued Jul. 31, 2012 to TTC/TEMA), an in-wheel electric motor/generator system, an electromagnetic or hydraulic motor for omni-directional drives, batteries, super capacitors, hydraulic pumps for telescoping shafts, and/or omni-directional drives which enable the wheel's rotation about a vertical axis. The above units may each be compactly packaged around the wheel, with the electric motor/generator and braking system located inside the wheel.

Figure 5:
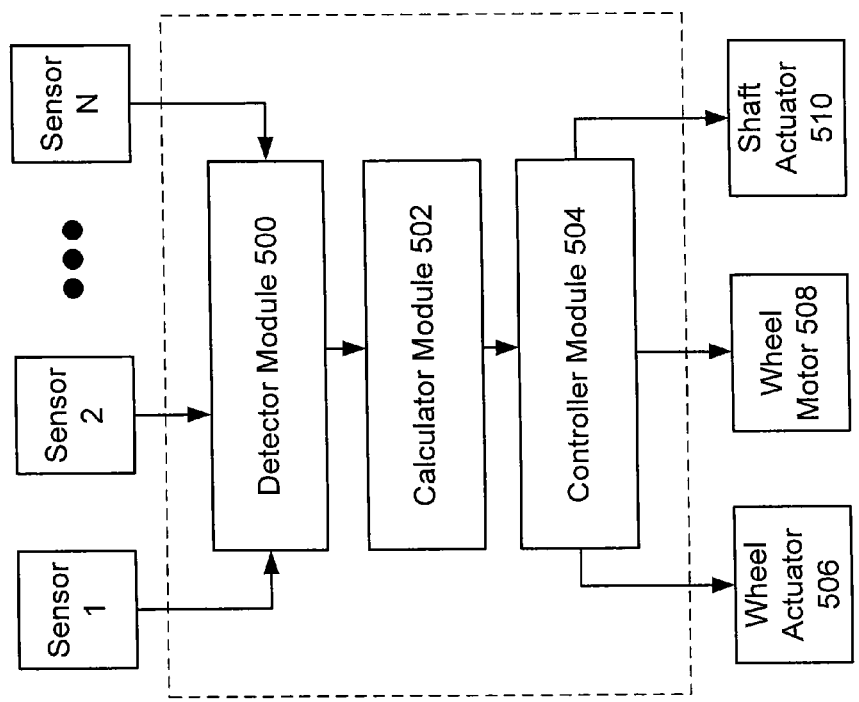
FIG. 5 schematically illustrates an exemplary control system.

FIG. 5 illustrates a block diagram of a control system according to an exemplary embodiment. As shown in FIG. 5, the control system may include one or more sensors 1 . . . N. The sensors may be configured to detect position and/or size information of obstacles in an area surrounding a vehicle. The sensors may, e.g., be one or more of a lidar, a radar, a sonar, a camera, or a combination thereof. The type, mounting location, and number of sensors included in the control system of FIG. 5 may be selected according to the operating environment and the type of vehicle in which the control system is employed. The sensors may provide an input to a detector module 500.

Detector module 500 may be configured to determine whether an obstacle is detected in a surrounding environment of a vehicle based on the input of the sensors. Detector module 500 may be further configured to determine position and/or size data of a detected object based on the sensor input. The position data may include information describing a position of the detected object relative to a vehicle. For example, the position data may include a distance, a bearing, a geographical coordinate, or the like, of a detected object. The size data may include information describing the dimensional characteristics of the detected object. For example, the size data may include a height, a width, a shape, or a combination thereof, corresponding to the detected object.

Detector module 500 may be further configured to classify a detected object based on size and/or position data. For example, detector module 500 may determine a detected object is a semi-truck, a passenger vehicle, an SUV, or another vehicle type based on the size and/or location information. Further, detector module 500 may classify other detected objects such as road signs, road debris, or structural material (e.g., a highway overpass or guard rail).

The detector module 500 may be further configured to receive an input from one or more sensors at a predetermined frequency such that the received position data and/or size data are updated at the predetermined frequency to form historical tracking data corresponding to a detected object. The tracking data may include relative motion information used to determine a predicted trajectory of the detected object over a predetermined time period.

The exemplary control system of FIG. 5 may also include a calculator module 502. Calculator module 502 may be configured to calculate an adjustment signal based on position data and/or size data received from detector module 500. The adjustment signal may include control information used by physical actuator units for altering a vehicle configuration (e.g., vehicle cabin height and/or wheelbase width).

Calculator module 502 may also calculate trajectory information corresponding to a detected object based on received tracking history data, such as that determined by detector module 500. Additionally, calculator module 502 may calculate trajectory information based a current velocity and a direction of motion for a vehicle on which the exemplary control system employed.

Calculator module 502 may also be configured to calculate a collision time, which corresponds to a time at which a detected object and the vehicle in which the control system is used will collide and/or intersect trajectory paths. In calculating the collision time, calculator module 502 may include predetermined safety buffers for each vehicle/object trajectory such that an appropriate margin of safety is maintained. For example, the control system may determine areas of uncertainty surrounding the detected obstacle/vehicle location and/or the reconfigurable vehicle location such that a collision is determined to potentially occur when the respective areas of uncertainty intersect trajectories.

The calculation of the collision time may be based on the trajectory information of the detected object and the trajectory information of the vehicle in which the control system is used. The calculation of a collision time by calculator module 502 may be used to calculate a rate at which a vehicle reconfiguration (i.e., adjusting vehicle cabin height and/or wheelbase width) is performed such that the energy required by such a reconfiguration is optimized.

For example, if calculator module 502 determines that a collision will occur in 10 seconds, the adjustment signal output by calculator module 502 may include information indicating that the vehicle reconfiguration must occur as quickly as possible (e.g., in less than 10 seconds) to avoid the collision. In contrast, if the calculator module 502 determines that a collision will occur in one minute, the adjustment signal output by calculator module 502 may include information indicating that the vehicle reconfiguration may occur at a relatively slower rate such that energy is conserved.

Turning back to FIG. 5, the control system may include a controller module 504. Controller module 504 may be configured to adjust a vehicle's height and/or a vehicle's wheelbase width based on a calculated adjustment signal, such as that calculated by calculator module 502. The adjustment of the vehicle's height and/or wheelbase width by controller module 504 may be performed such that the vehicle avoids colliding with a detected object/vehicle by reconfiguring the vehicle arrangement such that vehicle cabin height and/or wheelbase width are changed.

Controller module 504 may be configured to output to one or more physical actuators contained within a vehicle. For example, controller module 504 may output a control signal to a wheel actuator 506 such that the angle of a wheel assembly is adjusted relative to a vertical axis. Further, controller module 504 may output a control signal to wheel motor 508 such that the angular velocity of a wheel in a wheel assembly is accelerated or decelerated. Further, controller module 504 may output a control signal to a shaft actuator 510 such that, for example, telescoping shafts connected to a vehicle cabin and/or a wheel assembly are elongated in a horizontal and/or vertical direction such that the cabin height and/or the wheelbase width of a vehicle is changed.

It should be appreciated that control module 504 may be configured to adjust a vehicle's height and/or wheelbase width using wheel actuator 506, wheel motor 508, or shaft actuator 510 independently. However, these units may also be configured to adjust vehicle cabin height and/or wheelbase width in a coordinated fashion such that the height and/or wheelbase width is adjusted by any or all of the physical actuators at the same or at different times.

Figure 6:
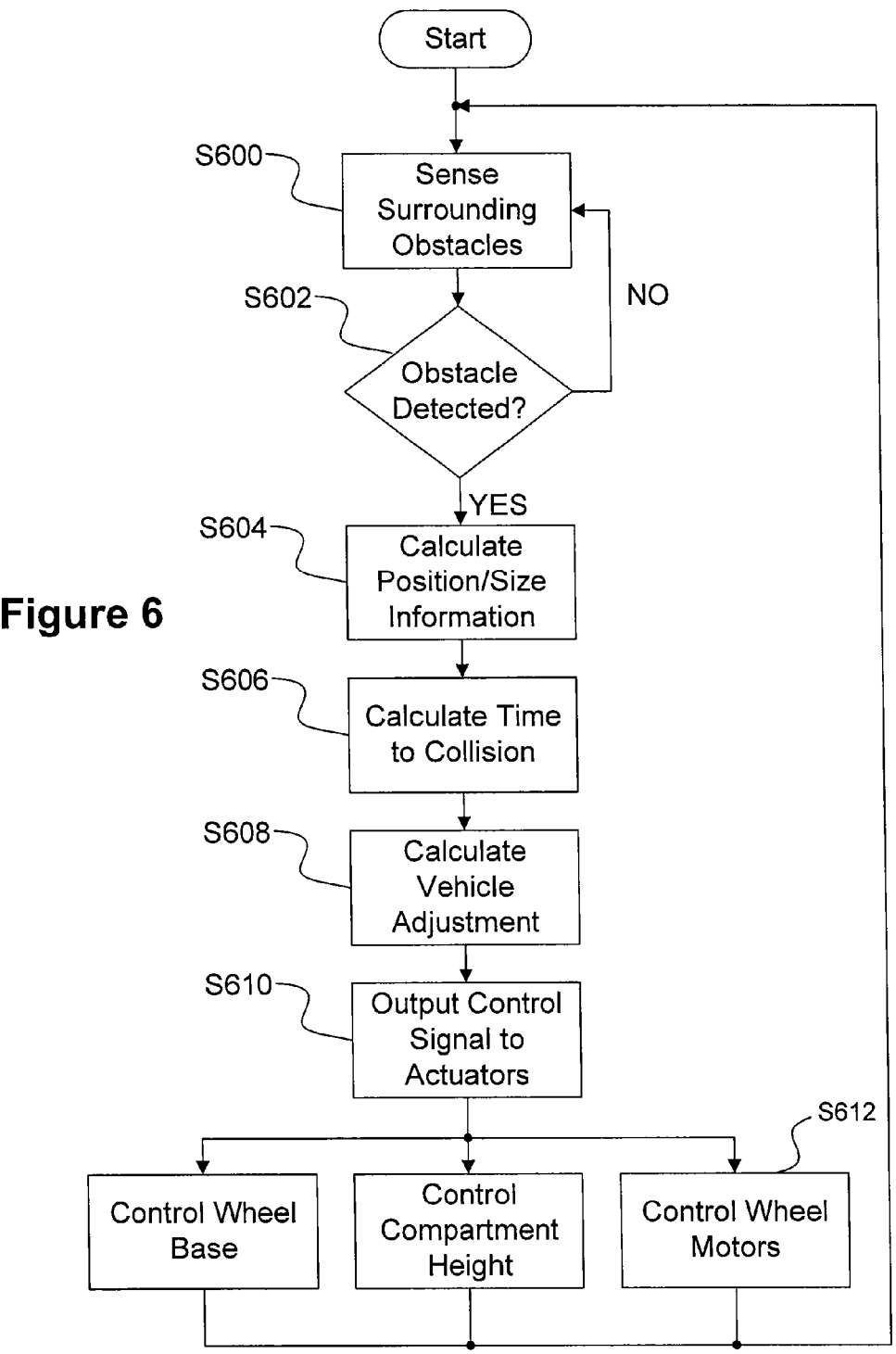
FIG. 6 is an algorithmic flow chart illustrating an exemplary control system method and process.

FIG. 6 is an algorithmic flow chart illustrating an exemplary control system method and process.

At step S600, the control system senses surrounding obstacles in an area around a vehicle. For example, the control system may detect another vehicle is in the roadway ahead of the vehicle.

At step S604, when the control system has detected an obstacle in the area surrounding the vehicle (S602), position and size information corresponding to the detected obstacle are calculated.

At step S606, a time of collision is calculated based on the detected object's calculated trajectory information, as well as trajectory information for the vehicle on which the control system is equipped. The time of collision corresponds to a time at which a vehicle will collide and/or intersect with a detected obstacle's trajectory. The time of collision may, for example, be used to determine a rate at which a vehicle's height and/or wheelbase width is adjusted.

At step S608, an adjustment signal corresponding to a control signal for adjusting a vehicle's height and/or wheelbase width is calculated.

At step S610, a control signal based on the calculated adjustment signal is output to one or more physical actuators. The physical actuators may, for example, be hydraulic pumps, electrical motors, or the like, for controlling the vehicle height and/or wheelbase width. For example, telescoping shafts with hydraulically operated pumps may be used to raise or lower a vehicle cabin height. Further, electrical motors may be used to control an angular direction and/or a speed at which a wheel on the vehicle rotates such that wheel assemblies connected to telescoping shafts pivot about the vehicle cabin via passive joints. As discussed in previous paragraphs, the rotation of the wheel assemblies relative to the vehicle cabin acts to effectively alter the wheelbase width. Once the vehicle's height and/or wheelbase width is changed in response to the detected obstacle, the control method returns to step S600 to detect further obstacles which may be in the vehicle's path and the method is repeated.

Figure 7:
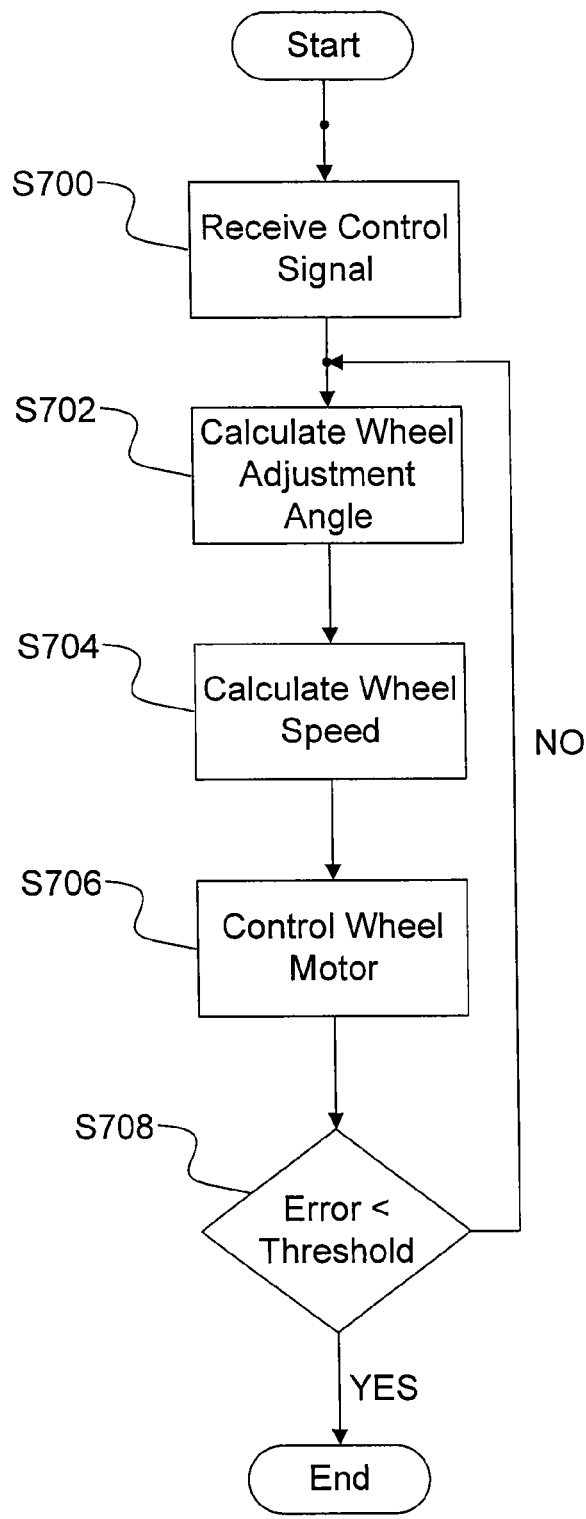
FIG. 7 is an algorithmic flow chart illustrating an exemplary method and process of controlling a vehicle wheel motor.

FIG. 7 is an algorithmic flow chart illustrating an exemplary method and process of controlling a vehicle wheel motor.

At step S700, the control system receives a control signal, such as that calculated from the adjustment signal in steps S608 and S610 of FIG. 6. When the control signal is received, a wheel adjustment angle is calculated at step S702. The wheel adjustment angle may be used to angle wheels in wheel assemblies (see, e.g., FIG. 4) at an inward or outward direction such that, when used in conjunction with passive vehicle joints connected to the vehicle cabin (see, e.g., joint 200 of FIG. 2C), the wheel assemblies pivot about the vehicle cabin such that the wheelbase width is changed.

At step S704, a wheel speed is calculated based on the received control signal. The calculated wheel speed may be used in conjunction with the calculated wheel adjustment angle as described above to decrease or increase the wheelbase width. In particular, the combination of adjusting a wheel assembly angle and the relative wheel speed results in the wheel assembly rotating about the vehicle cabin.

At step S706, a wheel motor, such as that in the wheel assembly shown in FIG. 4, is controlled using the calculated wheel adjustment angle and the calculated wheel speed to respectively angle the wheel assembly inward/outward and/or increase or decrease wheel velocity such that a wheelbase width is changed.

At step S708 an error signal is calculated based on the new wheelbase width which results from the adjustment performed in step S706. The error signal may be derived by comparing the new wheelbase width to a threshold, wherein the threshold corresponds to, e.g., a detected object's size derived from the position and/or size data calculated in, e.g., step S604 of FIG. 6. If the error signal is less than the threshold (i.e., the vehicle configuration is insufficient to safely avoid colliding with the obstacle), then the control method returns to step S702, at which point a wheel adjustment angle and wheel speed are re-calculated and adjusted until the error is less than the threshold at step S708.

Figure 8:
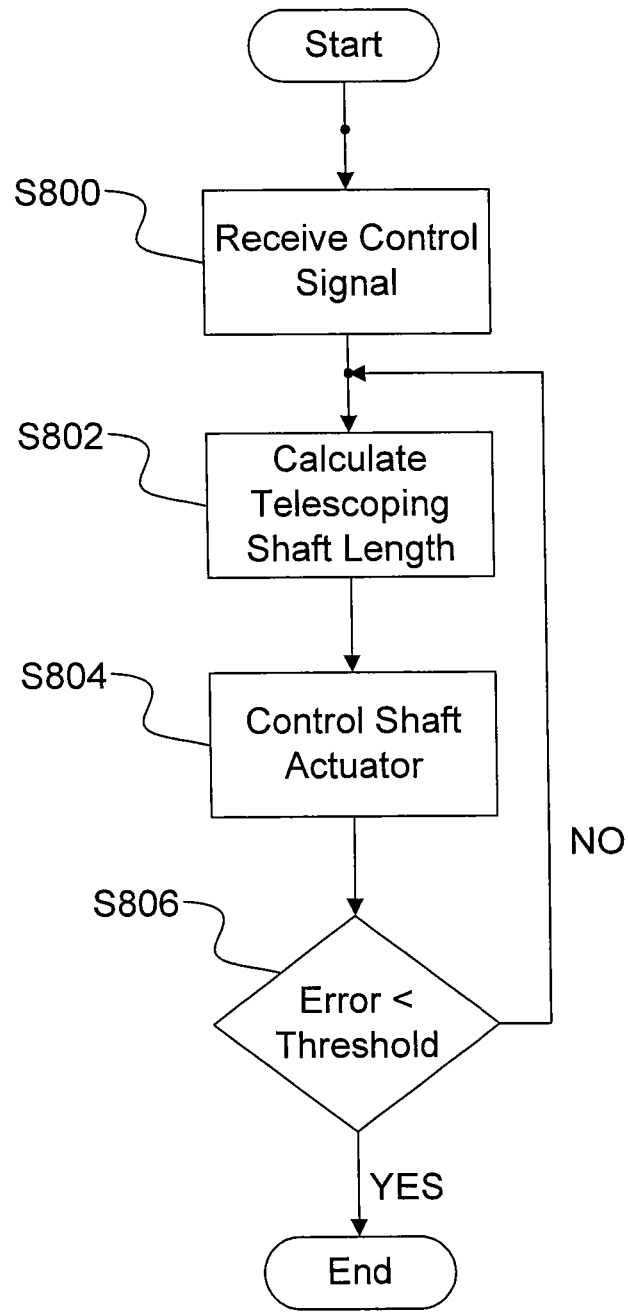
FIG. 8 is an algorithmic flow chart illustrating an exemplary method and process of controlling a vehicle cabin height.

FIG. 8 is an algorithmic flow chart illustrating an exemplary method and process of controlling a vehicle cabin height.

At step S800, the control system receives a control signal, such as the control signal derived from the adjustment signal in steps S608 and S610 of FIG. 6.

At step S802, the control system calculates a target telescoping shaft length based on the received control signal. The target telescoping shaft length may, for example, be a length to which an electromechanical telescoping shaft such as that shown in FIGS. 1A through 1B expands. The telescoping shaft may be respectively connected at opposing ends to a wheel assembly and a vehicle cabin (see, e.g. FIG. 1A) such that the altering of the telescoping shaft length raises or lowers a vehicle cabin.

At step S804, based on the calculated telescoping shaft length, a hydraulic shaft actuator is controlled to increase or decrease a length of one or more telescoping shafts connected to a vehicle cabin and vehicle wheel assembly. As described above, the increase or decrease in telescoping shaft length raises or lowers a vehicle cabin height such that an obstacle detected in an area surrounding the vehicle is avoided by, e.g., driving the vehicle cabin above the detected obstacle while maintaining contact with the road via the wheel assemblies (see, e.g., FIG. 1B).

At step S806, an error signal is derived based on the new vehicle cabin height. The error signal is compared to a threshold, wherein the threshold corresponds to a target vehicle height based on, e.g., the size data determined in step S604 of FIG. 6. If the error signal is less than the determined threshold (i.e., the vehicle reconfiguration is insufficient to avoid colliding with the obstacle), the control system returns to step S802, where the telescoping shaft length is adjusted until the error signal decreases below the threshold.

It should be appreciated that the exemplary method of FIG. 8 may be adapted to alter a wheelbase with via the elongation of horizontal telescoping shafts, such as telescoping shaft 102b in FIG. 1B.

Figure 9:
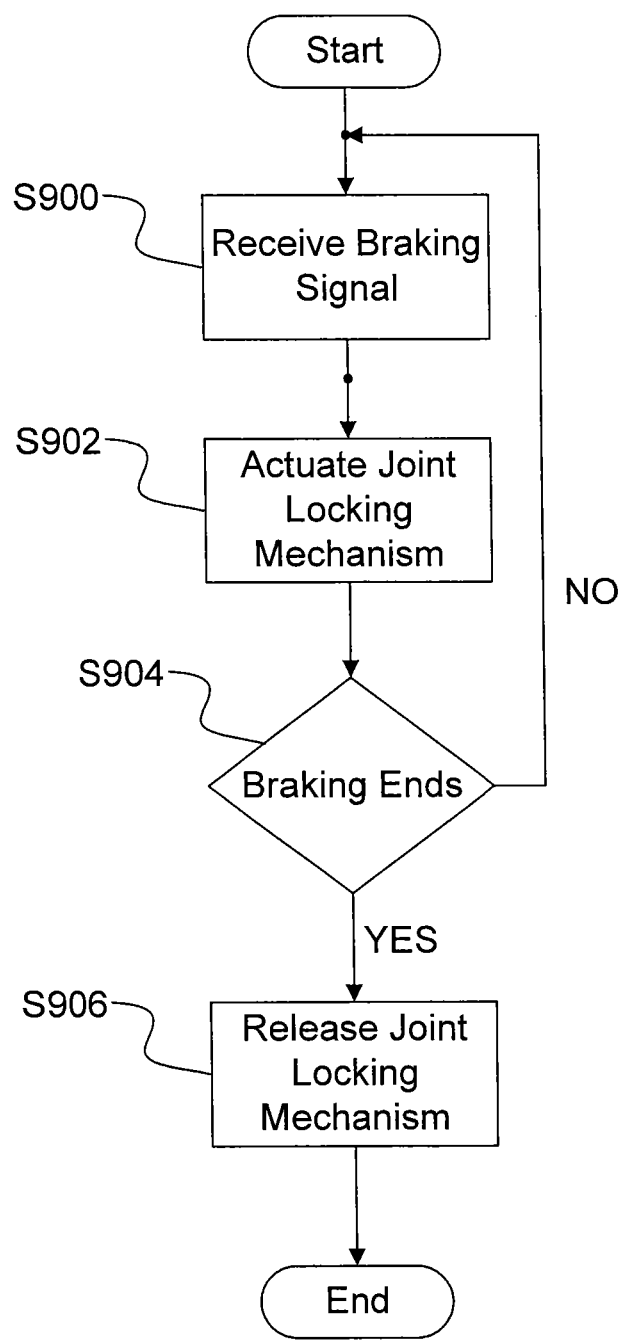
FIG. 9 is an algorithmic flow chart illustrating an exemplary method and process of controlling vehicle structural joints.

FIG. 9 is an algorithmic flow chart illustrating an exemplary method and process of controlling vehicle structural joints.

As discussed above regarding FIG. 2C, utilizing passive joints allows for wheel assemblies, such as wheel assembly 104 shown in FIG. 2C, to be controlled independently such that a wheelbase width is changed using adjustments in wheel assembly angle, in conjunction with increases or decreases in wheel speed. Accordingly, the method of FIG. 9 may, e.g., be used to control the motion of a telescoping shaft which is connected to the passive joint, such as joint 200 in FIG. 2C. In particular, the method may be used while engaging a vehicle's brakes so that undesirable motion of the wheel assembly and telescoping shaft system is prevented during the braking.

Turning to FIG. 9, the control system receives a braking signal at step S900. When the braking signal is received, a joint locking mechanism is actuated at step S902 such that telescoping shafts connected to a vehicle cabin at the passive joints are prevented from rotating about the vehicle cabin while the brakes are applied.

At step S904, the control system detects a point at which the braking of the wheel assemblies ends. As shown in FIG. 9, the joint locking mechanisms will be activated at step S902 until the control system detects that the braking has ended. When it is determined that the braking has ended, the joint locking mechanisms for the passive joints are released at step S906.

Figure 10:
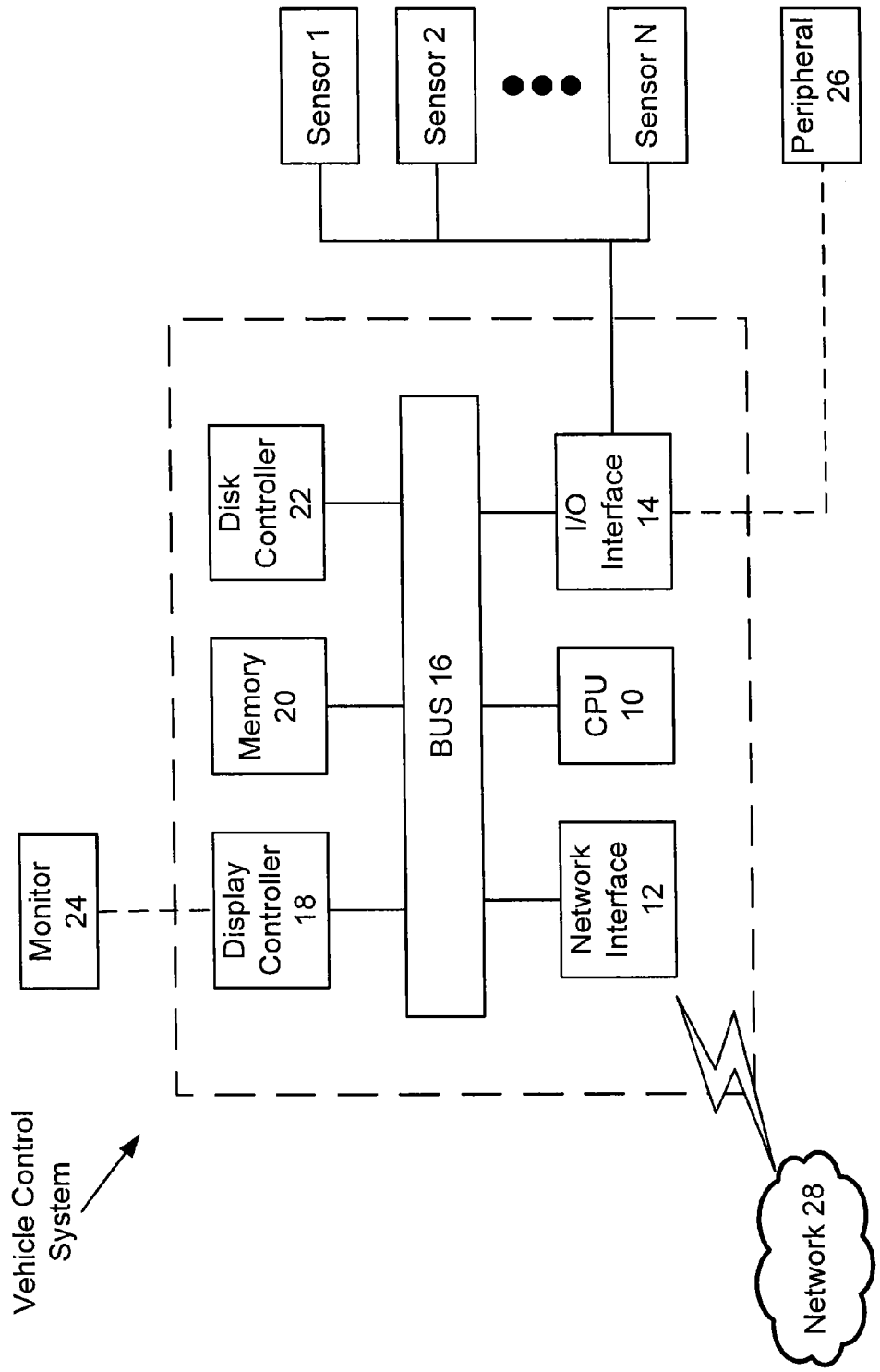
FIG. 10 schematically illustrates exemplary processing hardware of a control system.

FIG. 10 schematically illustrates exemplary processing hardware of a control system. The processes, algorithms and electronically driven systems described herein can be implemented via a discrete control device provided in the vehicle, or can be implemented by a central processing device of the vehicle, such as an electronic control unit (ECU). Such a system is described herein as a processing system.

As shown in FIG. 10, a processing system in accordance with the present disclosure can be implemented using a microprocessor or its equivalent, such as a central processing unit (CPU 10) or at least one application specific processor ASP (not shown). The microprocessor utilizes a computer readable storage medium, such as a memory 20 (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller 22, which can control a hard disk drive or optical disk drive.

The microprocessor or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit form parallel processing capabilities of a multi-cored CPU.

In another aspect, results of processing in accordance with this disclosure can be displayed via a display controller 18 to a monitor 24. The display controller 18 would then preferably include at least one graphic processing unit for improved computational efficiency.

Additionally, an I/O (input/output) interface 14 is provided for inputting sensor data from Sensors 1, 2 . . . N.

Further, as to other input devices, the same can be connected to the I/O interface 14 as a peripheral. For example, a keyboard or a pointing device (not shown) for controlling parameters of the various processes and algorithms of this disclosure can be connected to the I/O interface 14 to provide additional functionality and configuration options, or control display characteristics. Moreover, the monitor 24 can be provided with a touch-sensitive interface to a command/instruction interface.

The above-noted components can be coupled to a network 28, as shown in FIG. 10, such as the Internet or a local intranet, via a network interface 12 for the transmission or reception of data, including controllable parameters. The network can also be a vehicle-centric network such as a vehicle local area network.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

A number of implementations have been described. Nevertheless, it will be understood that various modifications may be made without departing from the spirit and scope of this disclosure. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A processing system for a driven vehicle, comprising:
a detector configured to detect an object which is in an area surrounding the driven vehicle via one or more sensors mounted on the driven vehicle, and to generate one or more of position data and size data corresponding to the detected object;
a calculator configured to calculate an adjustment signal based on the one or more of the position data and the size data; and
a controller configured to adjust one or more of the driven vehicle's cabin height and the driven vehicle's wheelbase width, based on the calculated adjustment signal, such that the driven vehicle avoids colliding with the detected object, wherein
the controller is configured to adjust the vehicle's wheelbase width by controlling, based on the calculated adjustment signal, the direction or speed of one or more of the vehicle's wheels.

2. The processing system according to claim 1, wherein:
the detector is further configured to update the position data and the size data at a predetermined frequency to form tracking history data, and
the calculator is further configured to:
calculate a first trajectory corresponding to the detected object, based on the tracking history data,
calculate a second trajectory corresponding to the driven vehicle based on the vehicle's current velocity and direction of motion, and
calculate a collision time at which the first trajectory intersects the second trajectory.

3. The processing system according to claim 2, wherein the controller is further configured to control a rate at which the vehicle's height and/or wheelbase width are adjusted, based on the calculated collision time.

4. The processing system according to claim 1, wherein the controller is configured to adjust the driven vehicle's cabin height by controlling one or more telescoping shafts which are respectively connected at opposing ends to the driven vehicle's cabin and a wheel assembly.

5. The processing system according to claim 4, wherein the controller is configured to adjust the vehicle's wheelbase width by controlling a length, in combination with the direction and/or the speed of the one or more of the vehicle's wheels, of one or more telescoping shafts which are respectively connected at opposing ends to the driven vehicle's cabin and a wheel assembly.

6. The processing system according to claim 4, wherein:
the telescoping shafts are each respectively connected to the vehicle cabin at a joint which allows the telescoping shafts to independently pivot in a direction around the vehicle cabin.

7. The processing system according to claim 6, wherein the joint includes a locking mechanism configured to prevent the telescoping shafts from pivoting around the vehicle cabin when a braking signal for the wheel assemblies is received.

8. The processing system according to claim 1, wherein:
the position data includes information describing a position of the detected object relative to the driven vehicle, and
the size data includes information describing the dimensional characteristics of the detected object.

9. The processing system according to claim 8, wherein the detector is further configured to classify the detected object based on one or more of the position data and the size data.

10. The processing system according to claim 1, wherein the controller is configured to adjust the vehicle's wheelbase width by controlling a length of one or more telescoping shafts which are respectively connected at opposing ends to the driven vehicle's cabin and a wheel assembly.

11. A control method for a driven vehicle, the method comprising:
detecting an object which is in an area surrounding the driven vehicle via one or more sensors mounted on the driven vehicle;
generating one or more of position data and size data corresponding to the detected object;
calculating an adjustment signal based on the one or more of the position data and the size data; and
adjusting the driven vehicle's height and/or the driven vehicle's wheelbase width, based on the calculated adjustment signal, such that the driven vehicle avoids colliding with the detected object, wherein
the adjusting of the driven vehicle's wheelbase width includes controlling, based on the calculated adjustment signal, the direction or speed of one or more of the vehicle's wheels.

12. A non-transitory computer readable medium having instructions stored therein that when executed by a processor, causes the processor to perform the method of claim 11.

13. A vehicle comprising:
a detector configured to detect an object in an area surrounding the vehicle via one or more sensors mounted on the vehicle, and to generate one or more of position data and size data corresponding to the detected object;
a calculator configured to calculate an adjustment signal based on the one or more of the position data and the size data; and
a controller configured to adjust one or more of the vehicle's cabin height and the vehicle's wheelbase width, based on the calculated adjustment signal, such that the vehicle avoids colliding with the detected object, wherein the controller is configured to adjust the vehicle's wheelbase width by controlling, based on the calculated adjustment signal, the direction or speed of one or more of the vehicle's wheels.

14. The vehicle according to claim 13, further comprising:

one or more telescoping shafts which are respectively connected at opposing ends to the vehicle's cabin and a wheel assembly, wherein the controller is configured to adjust the vehicle's cabin height and/or wheelbase width, based on the adjustment signal, by elongating or contracting the one or more telescoping shafts.

15. The vehicle according to claim 14, wherein the telescoping shafts are connected to the vehicle cabin by one or more joints, the joints being configured to permit the telescoping shafts to pivot around the vehicle.

16. The vehicle according to claim 15, wherein the joints include a braking mechanism configured to prevent the telescoping shafts from pivoting around the vehicle.

\* \* \* \* \*